United States Patent
Mantzaris

(10) Patent No.: US 12,386,852 B2
(45) Date of Patent: Aug. 12, 2025

(54) SYSTEMS AND METHODS FOR GENERATING NETWORK DIAGRAMS BASED ON BIG DATA

(71) Applicant: University of Central Florida Research Foundation, Inc., Orlando, FL (US)

(72) Inventor: Alexander V. Mantzaris, Orlando, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 0 days.

(21) Appl. No.: 18/168,562

(22) Filed: Feb. 13, 2023

(65) Prior Publication Data
US 2023/0259524 A1    Aug. 17, 2023

Related U.S. Application Data

(60) Provisional application No. 63/267,998, filed on Feb. 14, 2022.

(51) Int. Cl.
*G06F 16/26* (2019.01)
*G06F 16/901* (2019.01)
*G06T 11/20* (2006.01)

(52) U.S. Cl.
CPC .................... *G06F 16/26* (2019.01)

(58) Field of Classification Search
CPC ..... G06F 16/26; G06F 16/9024; G06T 11/206
See application file for complete search history.

(56) References Cited

U.S. PATENT DOCUMENTS

| | | | | |
|---|---|---|---|---|
| 8,745,054 B1* | 6/2014 | Hsu | ......................... | G06F 16/34 707/750 |
| 9,836,183 B1* | 12/2017 | Love | ..................... | G06F 16/904 |
| 10,922,374 B1* | 2/2021 | Hooshmand | ........ | G06F 16/9536 |
| 2010/0161680 A1* | 6/2010 | Atre | ....................... | G06F 16/248 707/E17.142 |
| 2010/0223619 A1* | 9/2010 | Jaquet | ................. | H04L 67/1097 718/104 |
| 2012/0218289 A1* | 8/2012 | Rasmussen | ........... | G06T 11/206 345/619 |
| 2018/0122045 A1* | 5/2018 | Bi | ............................. | G06T 3/40 |
| 2021/0382944 A1* | 12/2021 | Li | .......................... | G06F 16/35 |

* cited by examiner

*Primary Examiner* — Robert W Beausoliel, Jr.
*Assistant Examiner* — Mohammad S Bhuyan
(74) *Attorney, Agent, or Firm* — Onyx IP Group

(57) ABSTRACT

A device may analyze a plurality of entries of a data set. The plurality of entries identify a plurality of variables. Each entry indicates a co-occurrence of variables of different types. The device may identify, based on analyzing the plurality of entries, variables of a first type and variables of a second type. The device may determine relationships between the variables of the first type and variables of the second type based on co-occurrences indicated by the plurality of entries. The relationships are determined without determining meaning of the variables of the first type and the variables of the second type. The device may detect a display size of a display device. The device may determine, based on the display size, a subset of the network diagram to provide to the display device and may provide the subset of the network diagram to the display device.

20 Claims, 8 Drawing Sheets

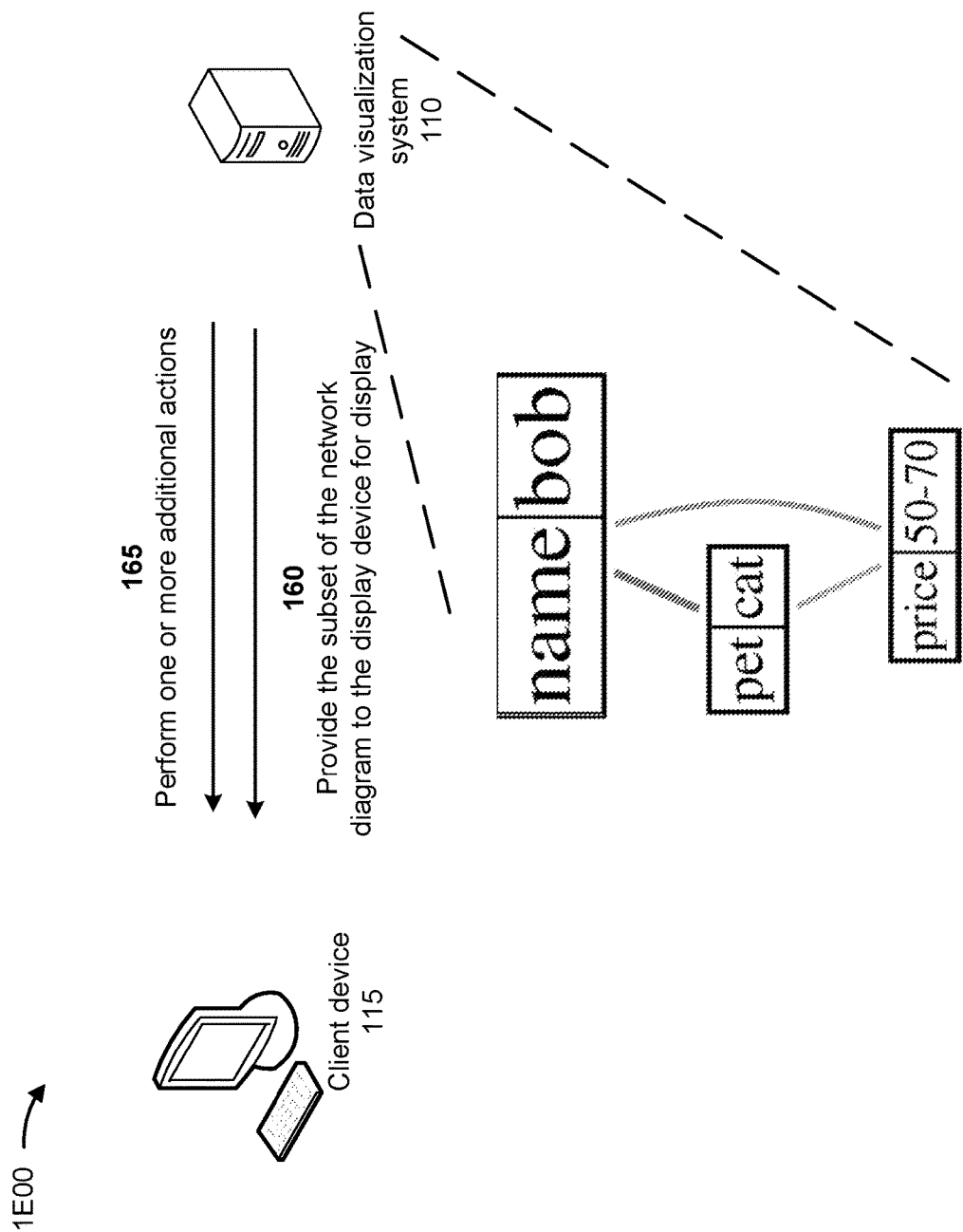

SYSTEMS AND METHODS FOR GENERATING NETWORK DIAGRAMS BASED ON BIG DATA

RELATED APPLICATION

This application claims priority to U.S. Provisional Patent Application No. 63/267,998, entitled "SYSTEMS AND METHODS FOR GENERATING NETWORK DIAGRAMS BASED ON BIG DATA," filed Feb. 14, 2022, which is incorporated herein by reference in its entirety.

BACKGROUND

Big data may refer to a field relating to ways to analyze, extract information from, or otherwise process data sets that are too large or too complex to be handled by traditional data-processing software. Some data may have many fields (columns) and may offer increased statistical power. Big data analysis challenges include capturing data, data storage, data analysis, data search, data sharing, data transfer, data visualization, data querying, data updating, among other examples.

SUMMARY

In some implementations, a method by a device includes analyzing a plurality of entries of a data set, wherein the plurality of entries identify a plurality of variables, and wherein each entry, of the plurality of entries, indicates a co-occurrence of variables of different types; identifying, based on analyzing the plurality of entries, variables of a first type and variables of a second type; determining relationships between the variables of the first type and variables of the second type based on co-occurrences indicated by the plurality of entries, wherein the relationships are determined without determining meanings of the variables of the first type and the variables of the second type; generating a network diagram based on the relationships, wherein the network diagram includes nodes and edges between the nodes, wherein each node, of the nodes, represents a variable of the plurality of variables, and wherein each edge, of the edges, represents a relationship of the relationships; detecting a display size of a display device associated with the device; determining, based on the display size, a subset of the network diagram to provide to the display device, wherein the subset of the network diagram includes: a particular node representing a particular variable, of the plurality of variables, associated with a quantities of co-occurrences that is highest out of a quantity of co-occurrences associated with each of the plurality of variables, and one or more other nodes representing one or more other variables, of the plurality of variables, that co-occur with the particular variable; and providing the subset of the network diagram to the display device for display.

In some implementations, a device includes one or more memories; and one or more processors, communicatively coupled to the one or more memories, configured to: obtain a data set that includes a plurality of entries, wherein the plurality of entries identify a plurality of variables, and wherein each entry, of the plurality of entries, indicates a co-occurrence of variables of different types; determine relationships between variables of a first type and variables of a second type based on co-occurrences indicated by the plurality of entries, wherein the relationships are determined without determining meaning of the variables of the first type and the variables of the second type; generate, based on the relationships, a network diagram includes nodes and edges between the nodes, wherein each node, of the nodes, represents a variable of the variables of the first type and variables of the second type, and wherein each edge, of the edges, represents a relationship of the relationships; detect a display size of a display device associated with the device; determine, based on the display size, a subset of the network diagram to provide to the display device wherein the subset of the network diagram includes: a particular node representing a particular variable, of the plurality of variables, associated with a quantities of co-occurrences that is highest out of a quantity of co-occurrences associated with each of the plurality of variables, and one or more other nodes representing one or more other variables, of the plurality of variables, that co-occur with the particular variable; and providing the subset of the network diagram to the display device for display.

In some implementations, a non-transitory computer-readable medium storing a set of instructions includes one or more instructions that, when executed by one or more processors of a device, cause the device to: obtain a data set that includes a plurality of entries, wherein the plurality of entries identify a plurality of variables, and wherein each entry, of the plurality of entries, indicates a co-occurrence of variables of different types; determine relationships between variables of a first type and variables of a second type based on co-occurrences indicated by the plurality of entries, wherein the relationships are determined without determining meaning of the variables of the first type and the variables of the second type; generate, based on the relationships, a network diagram includes nodes and edges between the nodes, wherein each node, of the nodes, represents a variable of the variables of the first type and variables of the second type, and wherein each edge, of the edges, represents a relationship of the relationships; detect a display size of a display device associated with the device; determine, based on the display size, a subset of the network diagram to provide to the display device wherein the subset of the network diagram includes: a particular node representing a particular variable, of the plurality of variables, associated with a quantities of co-occurrences that is highest out of a quantity of co-occurrences associated with each of the plurality of variables, and one or more other nodes representing one or more other variables, of the plurality of variables, that co-occur with the particular variable; and provide the subset of the network diagram to the display device for display.

BRIEF DESCRIPTION OF THE DRAWINGS

FIGS. 1A-1E are diagrams of an example associated with generating network diagrams based on big data.

DETAILED DESCRIPTION

Figure 1A:
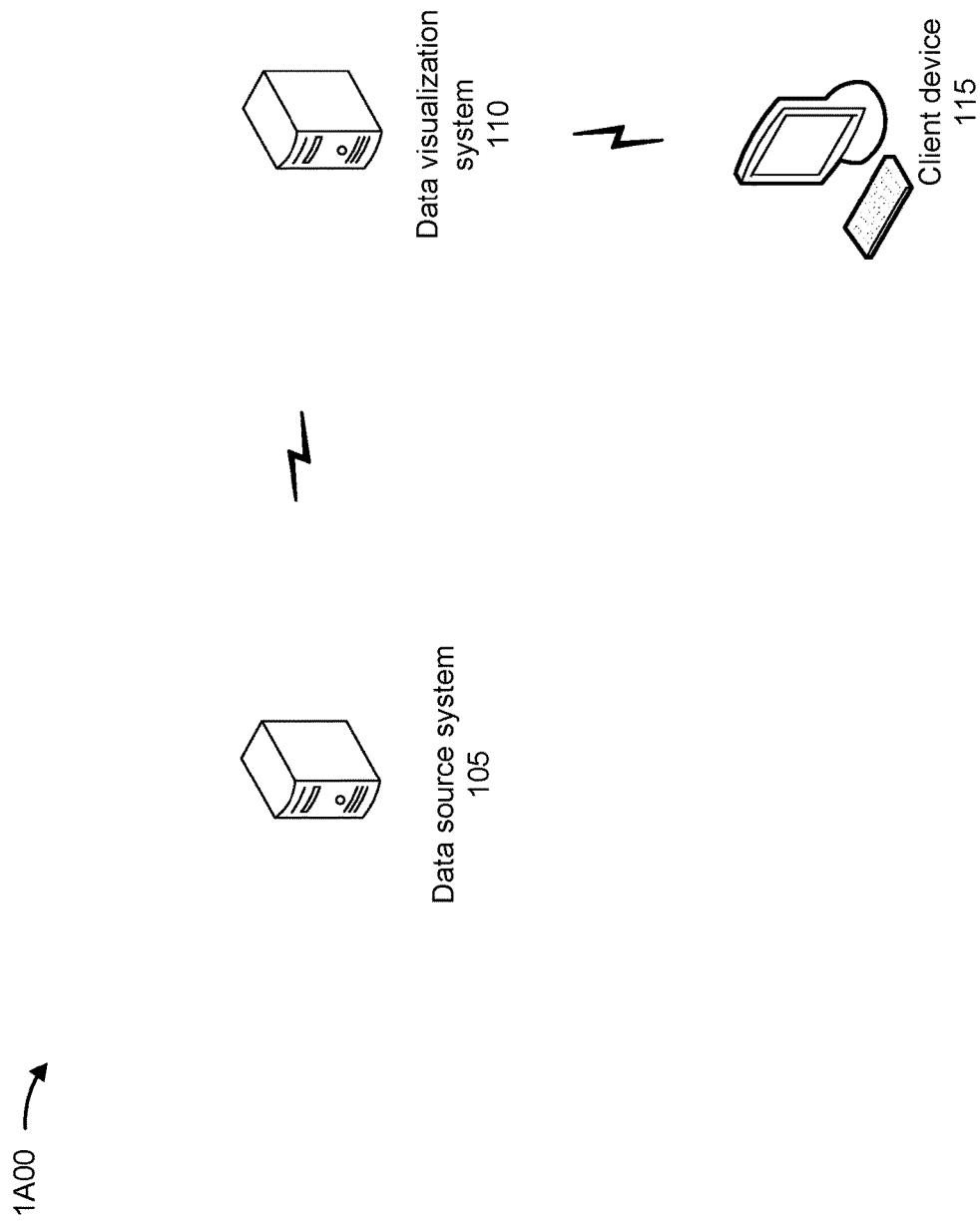

The following detailed description of example implementations refers to the accompanying drawings. The same reference numbers in different drawings may identify the same or similar elements.

Data may be processed by one or more computing devices. In some examples, as a result of processing the data, the one or more computing devices may generate graphical representations including a histogram, a pie chart, and/or a bar chart. The one or more computing devices may generate the graphical representations of the data to enable a visualization of the data for a human operator. The graphical representations may be displayed by one or more display devices associated with the one or more computing devices.

Depending one a size of the data, the graphical representations may convey a large amount of information to the human operator. For example, the data may be data that is too large or too complex to be handled by traditional data-processing software. As part of the processing the data, the one or more computing devices may analyze the data to determine meanings of variables included in the data. Accordingly, the one or more computing devices may consume a significant amount of computing resources, network resources, storage resources, among other resources to process the large amount of information. Some of the information may be unnecessary, superfluous, and/or redundant. In this regard, the one or more computing devices may waste computing resources, network resources, storage resources, among other resources that are used to generate information that may be unnecessary, superfluous, and/or redundant.

Additionally, or alternatively to generating information that may be unnecessary, superfluous, and/or redundant, the one or more computing devices may require input from the human operator in order to organize the data, categorize the data, and/or determine relationships between different pieces of the data. Requiring input in this manner may waste computing resources, network resources, storage resources, among other resources that are used to prompt the human operator for the input and/or that are used to process the data based on the input.

The human operator may use the one or more computing devices to evaluate the graphical representations and the information conveyed by the graphical representations. In some instances, the large amount of information may be overwhelming for the human operator. In this regard, using the one or more computing devices to evaluate the graphical representations may cause the human evaluator to experience cognitive strain and cognitive fatigue due to the large amount of information. As a result of the cognitive strain and the cognitive fatigue, the human operator may cause the one or more computing devices to generate inaccurate processed data (e.g., as a result of the human operator providing an incorrect input due to the cognitive strain and the cognitive fatigue).

Generating and using the inaccurate processed data may waste computing resources, network resources, storage resources, among other resources that are used to take remedial actions regarding the inaccurate processed data. The remedial actions may include causing the data to be re-processed by the one or more computing devices, using the one or more computing devices to determine when the inaccurate processed data was generated and/or used, using the one or more computing devices to identify other computing devices that may have used the inaccurate processed data, among other examples.

Implementations described herein are directed to producing network dashboards from static data sets and streams of data so that users can visualize and inspect a network diagram of underlying data (of the static data sets and the streams of data). For example, a data visualization system (e.g., one or more computing devices) may analyze the data sets to identify a co-occurrence associated with different variables included in the data sets. A co-occurrence may refer to one variable occurring with one or more other variables. A variable may refer to a data item. In some examples, the data sets may include data organized by rows and columns. Each row may include information indicate a co-occurrence (e.g., an occurrence of one variable occurring with one or more other variables at a same time). Each column may identify a different type of variable.

In some implementations, based on analyzing the rows, the data visualization system may determine relationships between different variables of the data sets. For example, the data visualization system may determine that a row indicates that a first variable, of a first type, occurs with a second variable of a second type. As a result of the co-occurrence, the data visualization system may determine that the first variable and the second variable are related. In other words, the data visualization system may determine that a relationship exists between the first variable and the second variable. The data visualization system may determine a quantity of co-occurrences of the first variable and the second variable.

The data visualization system may perform the above actions for all the variables of the data set. In some examples, the variables may include of one or more variables of the first type, one or more variables of the second type, one or more variables of a third type, and so on.

In some implementations, the data visualization system may determine the relationships without determining meanings of the variables. For instance, the data visualization system may determine the relationships without receiving any input (e.g., from a human operator) regarding meanings of the variables. In other words, the data visualization system may analyze the data agonistically and map the data to the network diagram. The network diagram may be more easily understood by the human operator regardless of whether the computer understands the data. By determining the relationships between the variables in this manner, the data visualization system may preserve computing resources, network resources, storage resources, among other resources that would have otherwise been used to determine meanings of the variables as part of determining the relationships.

As a result of performing the actions described above, the data visualization system may generate a network diagram that represents the relationships determined based on analyzing the data sets. In other words, the data visualization system may organize the data in a spatial map. In some examples, the network diagram may include a plurality of nodes and a plurality of edges connecting the plurality of nodes. Each node may represent a variable and each edge may represent a relationship between two variables. In some examples, each node may include a variable and information identifying a type of the variable.

By generating the network diagram without determining the relationships between the variables, the data visualization system may improve an efficiency and a speed of processing the data set and of generating the network diagram. In some implementations, the data visualization system may determine a width of an edge based on a quantity of occurrences of a relationship represented by the edge. Each variable type may be visually distinguished from another variable type. For example, variables of the first type may be provided in a first section of the network diagram (e.g., a first row, a first column, among other examples), variables of the second type may be provided in a second section of the network diagram (e.g., a second row, a second column, among other examples), and so on.

In some implementations, for each type, the data visualization system may identify a variable associated with a highest quantity of co-occurrences out of quantities of co-occurrences associated with all variables of the type. For example, the data visualization system may identify a first particular variable, of the first type, associated with a highest quantity of co-occurrences out of quantities of co-occurrences associated with all variables of the first type; a second particular variable, of the second type, associated with a highest quantity of co-occurrences out of quantities of co-occurrences associated with all variables of the second type; and so on.

In some situations, the data visualization system may visually distinguish a node representing each variable, of each type, associated with a highest quantities of co-occurrences. For example, a size of a node may be based on the quantity of co-occurrences. For instance, a size of a node representing the first particular variable may exceed size of a node representing the second particular variable based on the quantity of co-occurrences of the first particular variable exceeding the quantity of co-occurrences of the second particular variable.

In some situations, the data visualization system may visually distinguish an edge based on types of variables connected by the edge. For example, a visual attribute (e.g., a color) of an edge connecting a variable of the first type and a variable of the second type may different than a visual attribute (e.g., a color) of an edge connecting a variable of the second type and a variable of the third type.

By generating and providing the network diagram and by visually distinguishing the edges and the nodes as described herein, the data visualization system may reduce cognitive strain and cognitive fatigue of the human operator. As a result of reducing the cognitive strain and the cognitive fatigue, the data visualization system may preserve computing resources, network resources, storage resources, among other resources that would have otherwise been used to take remedial actions regarding inaccurate processed data (due to cognitive strain and cognitive fatigue).

In some implementations, the data visualization system may identify a particular variable associated with a highest quantity of co-occurrences out of quantity of co-occurrences associated with all the variables in the data set. A node, representing such particular variable, may be referred to a central node. The central node may be a node with a highest quantity of relationships with other nodes (e.g., and, accordingly, may be a most important node). In this regard, the central node may be a node from which remaining nodes, of the network diagram, may be reached with a fewest quantity of hops.

In some situations, the data visualization system may provide a subset of the network diagram that includes the central node and one or more other nodes connected to the central node. In some examples, the one or more other nodes may be associated with a highest quantity of co-occurrences of different types of variables. The nodes, of the subset of the network diagram, may be nodes from other nodes, of the network diagram, may be reached with a fewest quantity of hops (e.g., and, accordingly, may be most important nodes). In some implementations, the data visualization system may determine a display size of a display data visualization system associated with the data visualization system and may determine the subset based on the display size. For example, the data visualization system may determine nodes to be included in the subset based on the display size.

By providing the subset of the network diagram, the data visualization system may reduce cognitive strain and cognitive fatigue of the human operator. As a result of reducing the cognitive strain and the cognitive fatigue, the data visualization system may preserve computing resources, network resources, storage resources, among other resources that would have otherwise been used to take remedial actions regarding inaccurate processed data (due to cognitive strain and cognitive fatigue).

In some examples, the data set may relate to emergency situations (e.g., medical emergencies, criminal activities, etc.). In this regard, the data visualization system may automatically cause a first responder (and/or a vehicle of the first responder) to be dispatched to a location associated the emergency situations. For example, the data visualization system may transmit a notification to a device of the first responder and/or to the vehicle of the first responder.

FIGS. 1A-1E are diagrams of an example 100 associated with generating network diagrams based on big data. As shown in FIGS. 1A-1E, example 100 includes a data source system 105, a data visualization system 110, and a client device 115.

Data source system 105 may include one or more devices capable of receiving, generating, storing, processing, and/or providing information associated with generating network diagrams based on big data, as described elsewhere herein. As an example, data source system 105 may store a data set that may be processed by data visualization system 110. In some examples, the data set may be stored in a data structure such as a database, a table, a queue, and/or a linked list.

The data set may be data that is too large or too complex to be handled by traditional data-processing software (e.g., the data set may considered big data). The data set may include a plurality of entries. An entry (of the plurality of entries) may include different types of variable. For example, the entry may include a first variable of a first type, a second variable of a second type, a third variable of a third type, and so on.

Data visualization system 110 may include one or more devices capable of receiving, generating, storing, processing, and/or providing information associated with generating network diagrams based on big data, as described elsewhere herein. As an example, data visualization system 110 may obtain the data set from data source system 105, process the data set, and generate a network diagram based on processing the data set.

Client device 115 includes one or more devices capable of receiving, generating, storing, processing, and/or providing information associated with generating network diagrams based on big data described herein. As shown in FIG. 1A, client device 115 may include a display device. The display device may be associated with data visualization system 110. For example, data visualization system 110 may provide a network diagram to client device 115 to cause the display device to display the network diagram.

Figure 1B:
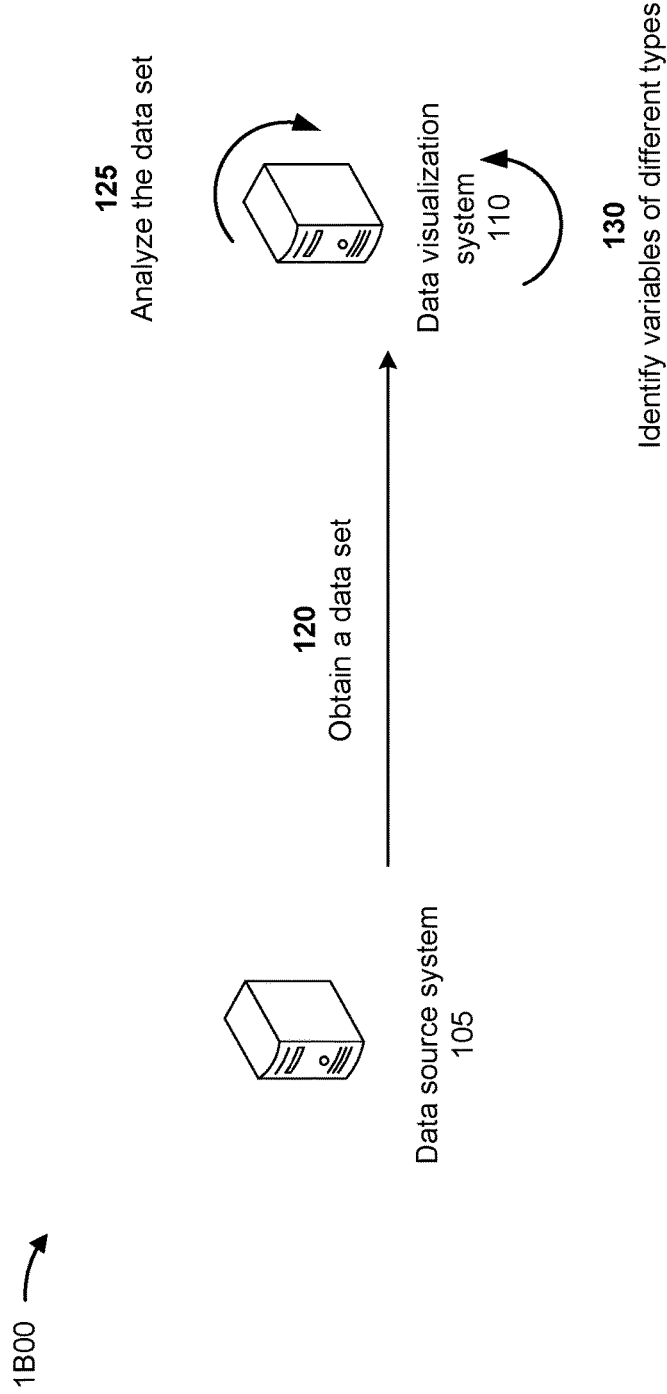

As shown in FIG. 1B, and by reference number 120, data visualization system 110 may obtain a data set. For example, data visualization system 110 may obtain the data set from data source system 105. In some examples, data visualization system 110 may obtain the data set periodically (e.g., every day, every other day, every week, among other examples). Additionally, or alternatively, data visualization system 110 may obtain the data set based on a trigger (e.g., based on a request from client device 115, based on data source system 105 providing an indication that the data set has been modified, among other examples).

In some examples, the data set may be structured data. For example, the data set may be included in a spreadsheet. The data set may include a plurality of entries. For example, the data set may include a plurality of rows and a plurality of columns. For instance, each row may include a plurality of variables and each column may represent a different type of variable. As an example, a first row may include a first variable of a first type in a first column, a second variable of a second type in a second column, a third variable of a third type in a third column, and so on; a second row may include a fourth variable of the first type in the first column, a fifth variable of the second type in the second column, a sixth variable of the third type in the third column; and so on.

In the example herein, the data set may be based on transactions (e.g., purchasing transactions) performed at a store (e.g., based on records of the transactions, such as receipts). In practice, the data set may be based on various other types of data.

As shown in FIG. 1B, and by reference number 125, data visualization system 110 may analyze the data set. For example, data visualization system 110 may analyze the data set to determine a structure of the data set. For instance, data visualization system 110 may determine a quantity of rows of the data set and/or a quantity of columns of the data set.

As shown in FIG. 1B, and by reference number 130, data visualization system 110 may identify variables of different types. In some implementations, based on analyzing the data set, data visualization system 110 may determine that the data set includes a plurality of variables and determine that the plurality of variables are of different types. For example, based on the quantity of columns of the data set, data visualization system 110 may determine that the data set includes variables of different types and may determine a quantity of types of variables included in the data set. For example, data visualization system 110 may determine that the data set includes variables of the first type, variables of the second type, variables of the third type, and so on.

Data visualization system 110 may identify the variables of different types or the quantity of types of variables without determining meanings of the variables. By identifying the variables of different types or the quantity of types of variables without determining the meaning of the variables, data visualization system 110 may preserve computing resources, storage resources, and/or network resources that would have otherwise been used to determine the meaning of the variables. Accordingly, a speed of processing and/or analyzing the data set may be improved.

Figure 1C:
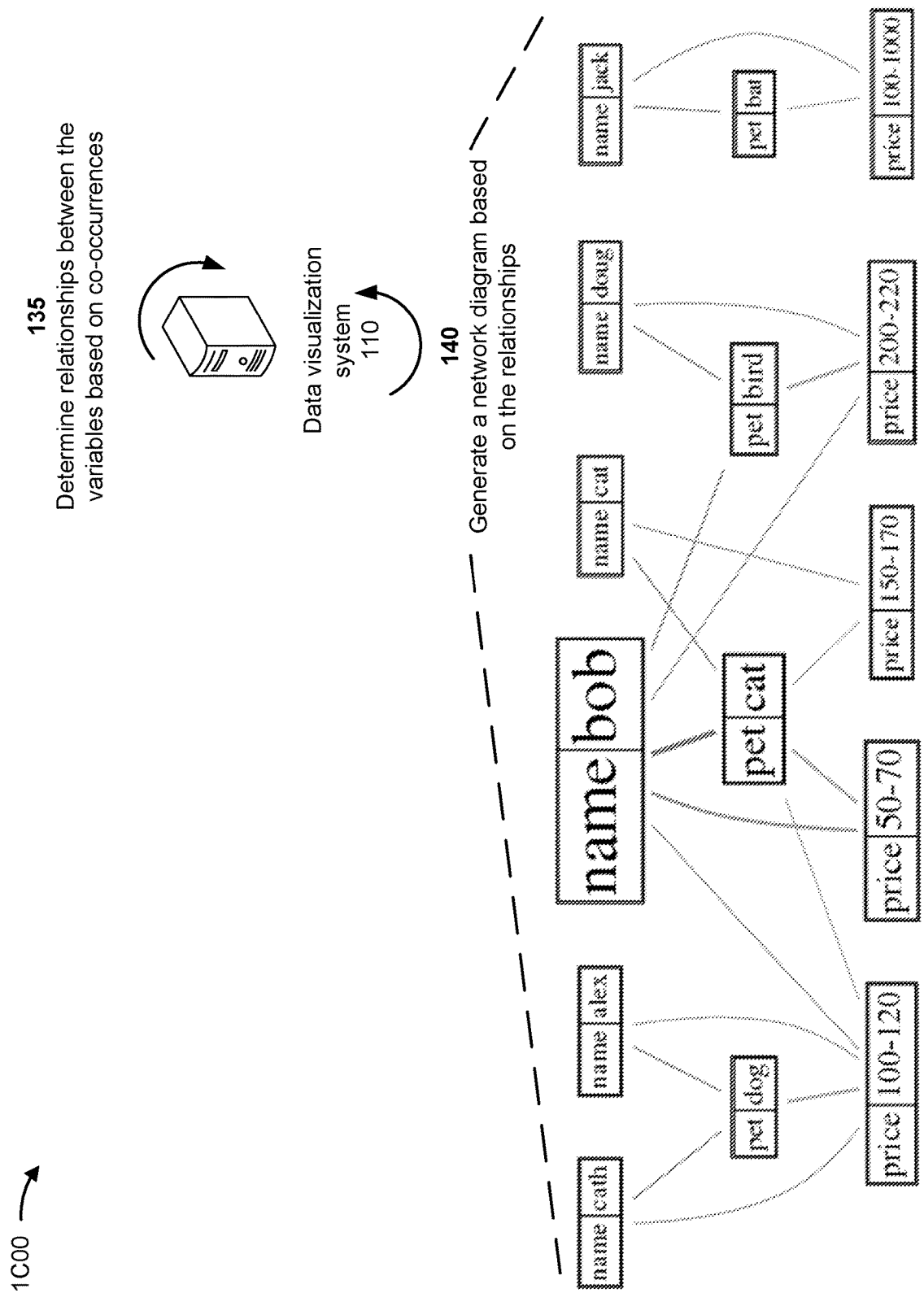

As shown in FIG. 1C, and by reference number 135, data visualization system 110 may determine relationships between the variables based on co-occurrences. In some implementations, data visualization system 110 may determine different relationships based on co-occurrences of variables of different types. For example, data visualization system 110 may determine a first relationship as a co-occurrence of a variable of the first type and a variable of the second type, a second relationship as a co-occurrence of a variable of the second type and a variable of the third type, a third relationship as a co-occurrence of a variable of the second type and a variable of the third type, and so on.

Data visualization system 110 may determine the relationships without determining meaning of the variables of different types. By determining the relationships without determining meaning of the variables of different types, data visualization system 110 may preserve computing resources, storage resources, and/or network resources that would have otherwise been used to determine the meaning of the variables. Accordingly, a speed of processing and/or analyzing the data set may be improved.

As shown in FIG. 1C, and by reference number 140, data visualization system 110 may generate the network diagram based on the relationships. The network diagram may include a plurality nodes and a plurality of edges between the plurality of nodes. Each node, of the plurality of nodes, may represent a variable of the plurality of variables included in the data set. Each edge, of the plurality of edges, may represent a relationship of the relationships identified by data visualization system 110. For example, an edge between a first node (representing the first variable) and a second node (representing the second variable) may indicate that the first variable occurred with the second variable.

In some implementations, when generating the network diagram, data visualization system 110 may build the network diagram from most important and central nodes first and iteratively including less important nodes which are scaled in size according to a measure of importance of the less important nodes. For example, data visualization system 110 may determine (e.g., based on the relationships) a most common variable for each variable type. For instance, data visualization system 110 may determine a most common variable out of the variables of the first type, a most common variable out of the variables of the second type, a most common variable of the variables of the third type, and so on. A "most common variable" may refer to a variable that occurs most other variables.

Data visualization system 110 may determine a size of the first node based on a quantity of co-occurrences associated with the first node. For example, data visualization system 110 may determine the size of the first node based on the quantity of times the first variable occurs with one or more other variables. For instance, the size of the first node may increase as the quantity of times the first variable occurs with one or more other variables increases.

Accordingly, if the first variable is the most common variable of the variables of the first type, the size of the first node may exceed a size of all other variables of the first type. In this regard, the network diagram may indicate that Bob is a most common variable (or most central variable) and the node (representing that variable) is biggest because Bob has more overlap with respect to purchases of other customers at the store.

Similarly, if the second variable is the most common variable of the variables of the second type, the size of the second node may exceed a size of all other variables of the second type. In this regard, the network diagram may indicate that cat is a most common variable of the second type (or most central variable of the second type) and the node (representing that variable) is biggest because cat has more overlap with respect to purchased pets at the store.

Based on the foregoing, and as shown in FIG. 1C, Bob is a customer who purchased the most pets and/or purchased the most different types (the variables) out of all customers of the store. As further shown in FIG. 1C, cat is a pet that was purchased most by the customers.

As shown in FIG. 1C for example, a size of a node representing the variable Bob of the type name exceeds sizes of nodes representing other variables of the type name. As further shown in FIG. 1C for example, a size of a node representing the variable cat of the type pet exceeds sizes of nodes representing other variables of the type pet. Based on the foregoing, the size of a variable being visualized is determined based on a measure of centrality of the variable.

Data visualization system 110 may determine a visual attribute of an edge between the first node and one of the one or more other nodes. In some implementations, when determining the visual attribute, data visualization system 110 may determine a width of the edge between the first node and the one of the one or more other nodes. The width may be based on the quantity of times the first variable occurs with another variable represented by the one of the one or more other nodes. Accordingly, the width of the first node may increase as the quantity of times the first variable occurs (with another variable) increases.

In some implementations, when determining the visual attribute, data visualization system 110 may determine a color of the edge between nodes. In some examples, data visualization system 110 may determine the color of the edge as a first color if the relationship between the nodes is the first relationship, may determine the color of the edge as a second color if the relationship between the nodes is the second relationship, may determine the color of the edge as a third color if the relationship between the nodes is the second relationship, and so on.

In some implementations, data visualization system 110 may generate the network diagram and provide the network diagram to one or more devices based on a trigger. For example, data visualization system 110 may provide the network diagram to client device 115 based on a request from client device 115. Additionally, or alternatively, data visualization system 110 may provide the network diagram to client device 115 periodically (e.g., every 12 hours, every day, every other day, among other examples).

An edge creation, for creating an edge between nodes is produced from observations of co-occurrence. The co-occurrence is found from the observations 'x_i' where if: x_i[variable name 1].exists==true and x_i[variable name 2].exists==true' then these 2 variables are connected to each other variable 1 <-> variable 2. The edge size (width) on the visualization is proportional to the number of such co-occurrences. Sum_i x_i[variable name 1].exists ==true and x_i[variable name 2].exists==true'=edge width for variable 1 <-> variable 2.

The size of the variable being visualized is determined by a centrality measure. This allows us to scale the visual representation of the variable value such as name of customer on the screen. From the set of edges an adjacency matrix A can be produced holding those variable edges and their weights from the number observed. Using the matrix 'A' we can then say that the centrality of variable 'i' is calculated to be proportional to the Katz centrality (or another suitable centrality measure such as betweenness centrality). Connectivity for recommendations associations can be computed with the weighted sibling node approach of taking the adjacency matrix and the square of it A+A^2 to see which users are most affiliated with other users for matching into groups.

From the tabular data structures that are loaded, each row corresponds to an observation of which each column holds a variable value. The values of string based data is taken to be categorical in nature and the values which are numerical are transformed into categorical as well. The number to categorical transformation is done by looking at the ranges of the numerical (or ordinal in nature data) and placed into ranges which can be represented by a categorical value. For each column being a variable, each variable value, constitutes a node that can be placed in the graph to be displayed to the user.

Each pair of columns can produce an edge type so that when the variable column values are observed the co-occurrence of the values produces and edge. For example, if there are columns for variable_1 and variable_2 and on an observation row in the table matrix variable_1='variable_1_value_1' and for the second column it is observed variable_2='variable_2_value_1' then there is an 'edge' between each node variable_1_value_1 and variable_2_value_1. For situations where there are more than 2 columns there are multiple column pairings and an edge for the variable_1_value_1 <-> variable_2_value_1 and with a new variable, variable_3: variable_1_value_1 and variable_3_value_1. The variable edges between variable pairings will be displayed different to the user to help identify the type of pairings more easily so that variable_1_value_* <-> variable_2_value_* (value_* generalizes over different values) is displayed differently than variable_1_value_* <-> variable_3_value_* edges.

This allows the user to see which columns produce values which co-occur with which other values coming from another column. Since a particular edge can appear multiple times from repetition in the rows, the width of the edge is scale or annotated so that the user can understand the number of times and edge pairing such as 'variable_1_value_1 <-> variable_2_value_1' has been seen in the dataset or have a relative scaling that is proportional to the number of times those 2 column variable values have occurred. The edge scaling is such that Sum_i (X[column_1][value==1]==X[column_2][value==1]).

Figure 1D:
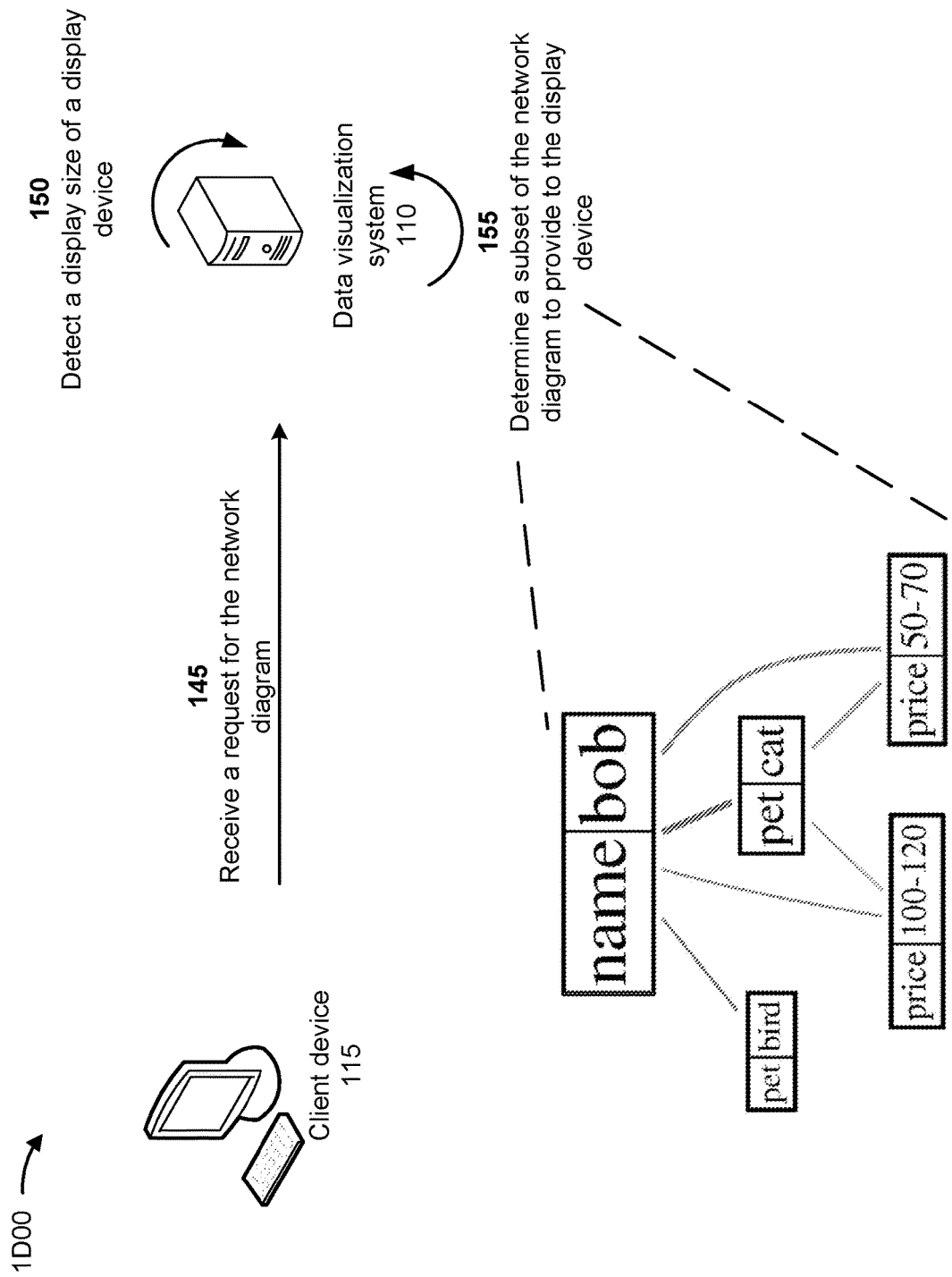

As shown in FIG. 1D, and by reference number 145, data visualization system 110 may receive a request for the network diagram. For example, data visualization system 110 may receive the request from client device 115. In some implementations, the request may include information identifying a size of the display device of client device 115.

As shown in FIG. 1D, and by reference number 150, data visualization system 110 may detect a display size of the display device. For example, data visualization system 110 may determine the display size based on the information identifying the size (included in the request).

As shown in FIG. 1D, and by reference number 155, data visualization system 110 may determine a subset of the network diagram to provide to the display device. The size of the display device may indicate a portion of the network diagram that is to be provided via the display device. For instance, the bigger the size of the display device, the greater the portion of the network diagram that is to be provided via the display device.

In some implementations, data visualization system 110 may compare the size to one or more size thresholds. If the size satisfies a first threshold, data visualization system 110 may provide a first portion of the network diagram, if the size satisfies a second threshold but does not satisfy the first threshold, data visualization system 110 may provide a second portion of the network diagram that is less than the first portion, and so on.

The number of nodes and edges can become too numerous for large complex datasets. The user can have the option to select manually different columns (variables) to reduce the edge complexity and to reduce the number of nodes but also to address the number of within variable value nodes a centrality based approach is proposed. The networks are constructed by first building the complete network/graph prior to the user display and from that applying a centrality algorithm such as the Katz centrality, eigenvector centrality, betweenness centrality etc. to find the centrality scores and ranking for each 'node' in the network and each node within each variable (column variable values). From the scores and ranking the order of preference to display to the user is possible. Then the graph to be shown to the user is produced by iterating through the nodes from highest to lowest score rank choices where preference is placed on changing variables, and then graphing them for the user. This graph can have more information included until a threshold is reached defined by the complexity of the graph the user can view and is parameterizable. The user can adjust this to include more nodes and edges if desired. The user can also look to remove columns from the data and include more. This adjacency matrix is a subset of the total adjacency, and can be used to also look for 'triangulation' via $(A+A^2)$ where $A^2$ is the square of the adjacency matrix. The square of the adjacency allows the user to see which variable values have common connections to each other (from the application of 'a common friend makes us connected as well') the variable values such as variable_1_value_1 and variable_1_value_2 can produce an edge although they can never co-occur in the same observation as they are mutually exclusive unable to occupy the same position. Such edges help the user know which variable values are produced with similar occurrences. The user can also look at these edges alone to look for redundancies and for variables which are unique as a manner of finding outliers.

As shown in FIG. 1E, and by reference number 160, data visualization system 110 may provide the subset of the network diagram to the display device for display. For example, data visualization system 110 may provide the subset of the network diagram to client device 115 to cause client device 115 to display.

s shown in FIG. 1E, and by reference number 165, data visualization system 110 may perform one or more additional actions. In some implementations, data visualization system 110 may generate a recommendation between the relationships determined by data visualization system 110. For example, data visualization system 110 may determine that a relationship exists between the first node and the second node and determine that a relationship exists between the second node and the third node. Accordingly, data visualization system 110 may determine that a relationship should exist between the first node and the second node. Therefore, data visualization system 110 may generate a recommendation that identifies the first node as related to the third node.

In some implementations, when performing the one or more actions, data visualization system 110 may cause one or more resources to be deployed based on the relationships.

In some examples, the data set may relate to emergency situations (e.g., medical emergencies, criminal activities, etc.). In this regard, data visualization system 110 may automatically cause a first responder (and/or a vehicle of the first responder) to be dispatched to a location associated with the emergency situations. For example, data visualization system 110 may transmit a notification to a device of the first responder and/or to the vehicle of the first responder.

As indicated above, FIGS. 1A-1E are provided as an example. Other examples may differ from what is described with regard to FIGS. 1A-1E. The number and arrangement of devices shown in FIGS. 1A-1E are provided as an example. In practice, there may be additional devices, fewer devices, different devices, or differently arranged devices than those shown in FIGS. 1A-1E. Furthermore, two or more devices shown in FIGS. 1A-1E may be implemented within a single device, or a single device shown in FIGS. 1A-1E may be implemented as multiple, distributed devices. Additionally, or alternatively, a set of devices (e.g., one or more devices) shown in FIGS. 1A-1E may perform one or more functions described as being performed by another set of devices shown in FIGS. 1A-1E.

Figure 2:
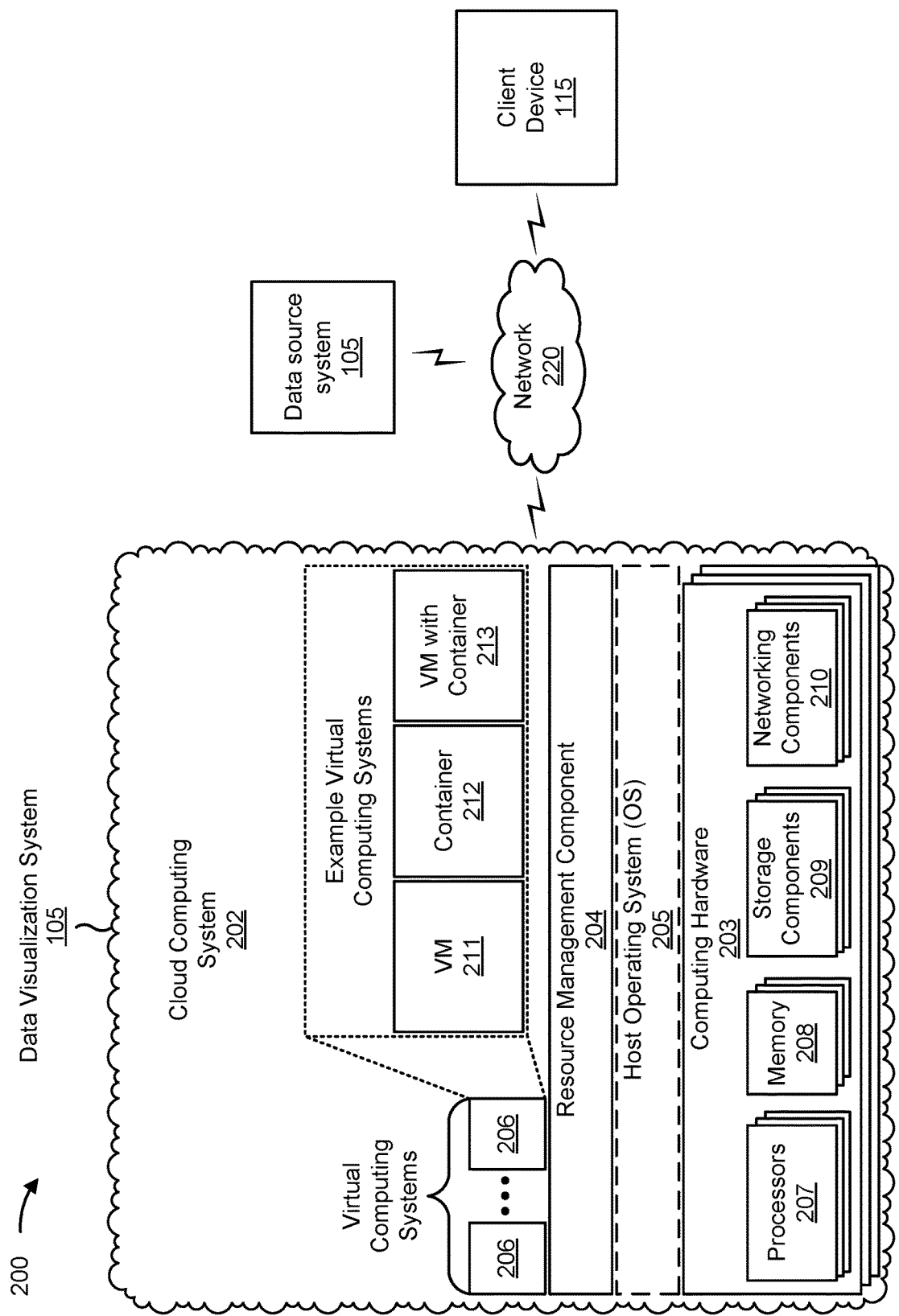
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a data visualization system 110, which may include one or more elements of and/or may execute within a cloud computing system 202. The cloud computing system 202 may include one or more elements 203-213, as described in more detail below. As further shown in FIG. 2, environment 200 may include a network 320, data source system 105, and/or client device 115. Devices and/or elements of environment 200 may interconnect via wired connections and/or wireless connections.

The cloud computing system 202 includes computing hardware 203, a resource management component 204, a host operating system (OS) 205, and/or one or more virtual computing systems 206. The cloud computing system 202 may execute on, for example, an Amazon Web Services platform, a Microsoft Azure platform, or a Snowflake platform. The resource management component 204 may perform virtualization (e.g., abstraction) of computing hardware 203 to create the one or more virtual computing systems 206. Using virtualization, the resource management component 204 enables a single computing device (e.g., a computer or a server) to operate like multiple computing devices, such as by creating multiple isolated virtual computing systems 206 from computing hardware 203 of the single computing device. In this way, computing hardware 203 can operate more efficiently, with lower power consumption, higher reliability, higher availability, higher utilization, greater flexibility, and lower cost than using separate computing devices.

Computing hardware 203 includes hardware and corresponding resources from one or more computing devices. For example, computing hardware 203 may include hardware from a single computing device (e.g., a single server) or from multiple computing devices (e.g., multiple servers), such as multiple computing devices in one or more data centers. As shown, computing hardware 203 may include one or more processors 207, one or more memories 208, one or more storage components 209, and/or one or more networking components 310. Examples of a processor, a memory, a storage component, and a networking component (e.g., a communication component) are described elsewhere herein.

The resource management component 204 includes a virtualization application (e.g., executing on hardware, such as computing hardware 203) capable of virtualizing computing hardware 203 to start, stop, and/or manage one or more virtual computing systems 206. For example, the resource management component 204 may include a hypervisor (e.g., a bare-metal or Type 1 hypervisor, a hosted or Type 2 hypervisor, or another type of hypervisor) or a virtual machine monitor, such as when the virtual computing systems 206 are virtual machines 211. Additionally, or alternatively, the resource management component 204 may include a container manager, such as when the virtual computing systems 206 are containers 212. In some implementations, the resource management component 204 executes within and/or in coordination with a host operating system 205.

A virtual computing system 206 includes a virtual environment that enables cloud-based execution of operations and/or processes described herein using computing hardware 203. As shown, a virtual computing system 206 may include a virtual machine 211, a container 212, or a hybrid environment 213 that includes a virtual machine and a container, among other examples. A virtual computing system 206 may execute one or more applications using a file system that includes binary files, software libraries, and/or other resources required to execute applications on a guest operating system (e.g., within the virtual computing system 206) or the host operating system 205.

Although the data visualization system 110 may include one or more elements 203-213 of the cloud computing system 202, may execute within the cloud computing system 202, and/or may be hosted within the cloud computing system 202, in some implementations, the data visualization system 110 may not be cloud-based (e.g., may be implemented outside of a cloud computing system) or may be partially cloud-based. For example, the data visualization system 110 may include one or more devices that are not part of the cloud computing system 202, such as device 300 of FIG. 3, which may include a standalone server or another type of computing device. The data visualization system 110 may perform one or more operations and/or processes described in more detail elsewhere herein.

Network 320 includes one or more wired and/or wireless networks. For example, network 320 may include a cellular network, a public land mobile network (PLMN), a local area network (LAN), a wide area network (WAN), a private network, the Internet, and/or a combination of these or other types of networks. The network 320 enables communication among the devices of environment 200.

The client device 130 includes one or more devices capable of receiving, generating, storing, processing, and/or providing information described herein. The client device 130 may include a communication device and/or a computing device. For example, the client device 130 may include a wireless communication device, a user equipment (UE), a mobile phone (e.g., a smart phone or a cell phone, among other examples), a laptop computer, a tablet computer, a handheld computer, a desktop computer, a gaming device, a wearable communication device (e.g., a smart wristwatch or a pair of smart eyeglasses, among other examples), an Internet of Things (IoT) device, or a similar type of device. The client device 130 may communicate with one or more other devices of environment 100, as described elsewhere herein.

The server device 140 includes one or more devices capable of receiving, generating, storing, processing, providing, and/or routing information described herein. The server device 140 may include a communication device and/or a computing device. For example, the server device 140 may include a server, an application server, a client server, a web server, a database server, a host server, a proxy server, a virtual server (e.g., executing on computing hardware), a server in a cloud computing system, a device that includes computing hardware used in a cloud computing environment, or a similar type of device. The server device 140 may communicate with one or more other devices of environment 100, as described elsewhere herein.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
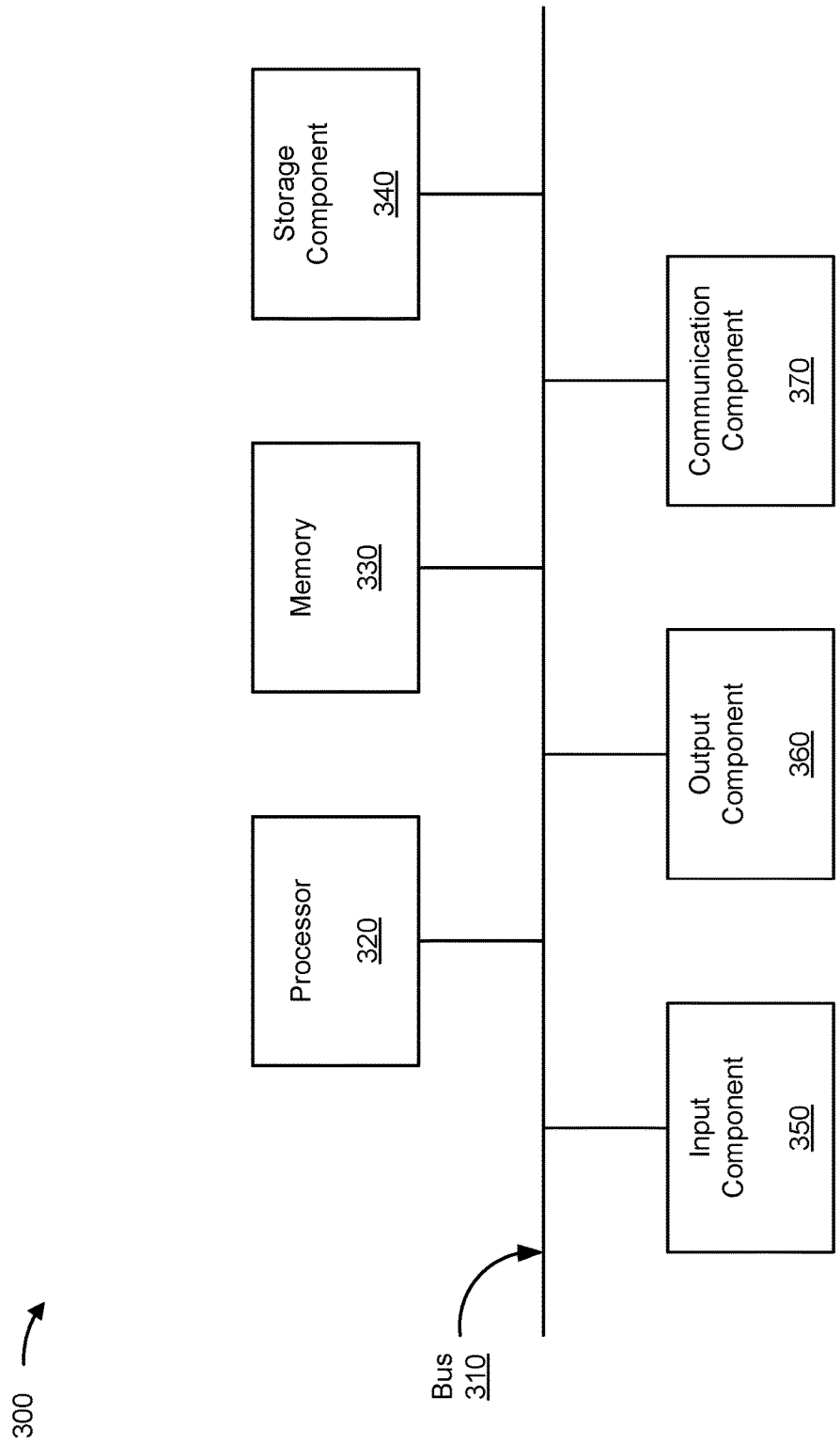
FIG. 3 is a diagram of example components of one or more devices of FIG. 3.

FIG. 3 is a diagram of example components of a device 300, which may correspond to data source system 105, data visualization system 110, and/or client device 115. In some implementations, data source system 105, data visualization system 110, and/or client device 115 may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random access memory), a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, an actuator, and/or the like. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, an antenna, and/or the like.

Device 300 may perform one or more processes described herein. For example, a non-transitory computer-readable medium (e.g., memory 330 and/or storage component 340) may store a set of instructions (e.g., one or more instructions, code, software code, program code, and/or the like) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
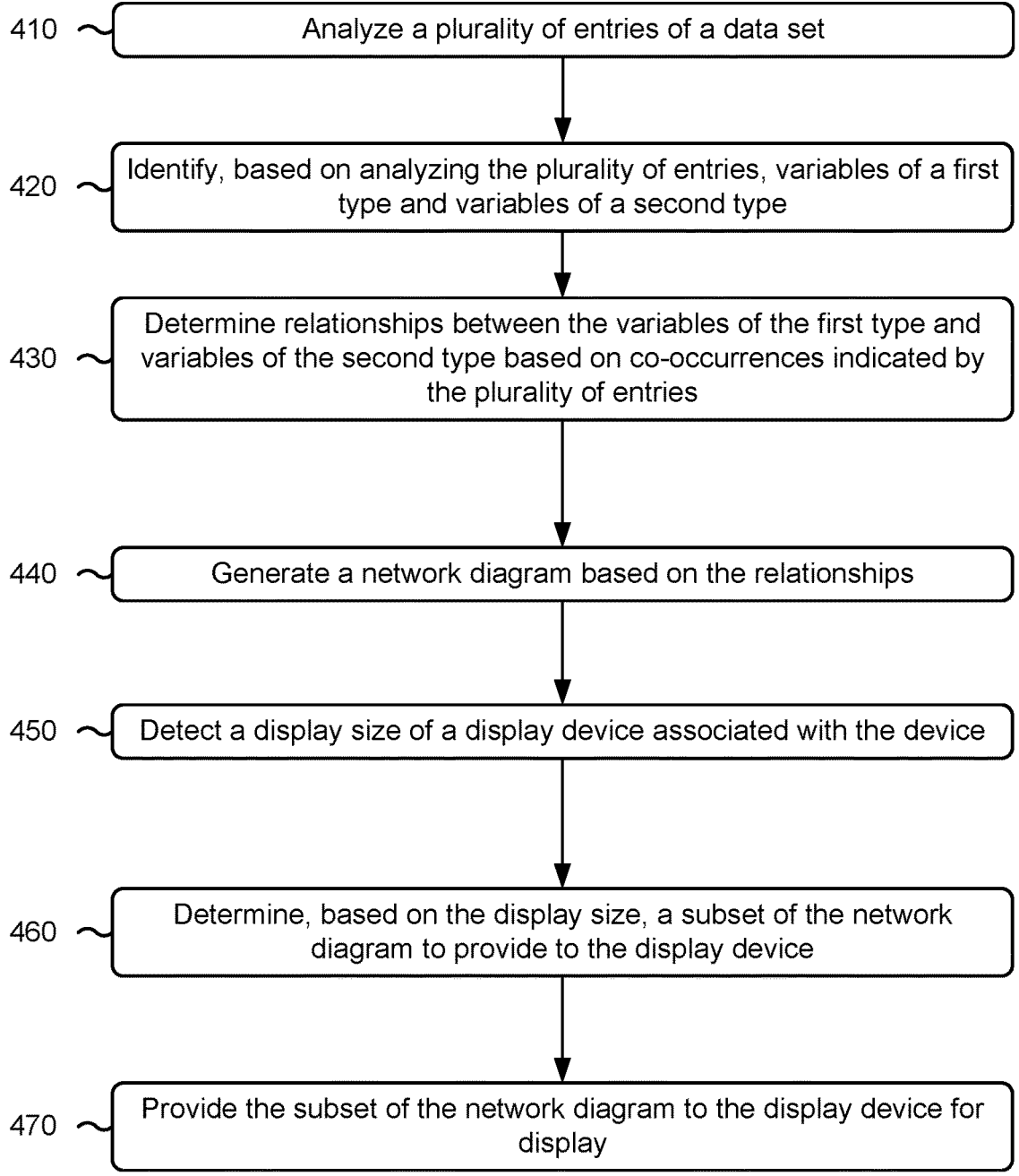
FIG. 4 is a flowchart of an example process relating to generating network diagrams based on big data.

FIG. 4 is a flowchart of an example process 400 relating to generating network diagrams based on big data. In some implementations, one or more process blocks of FIG. 4 may be performed by a data visualization system (e.g., data visualization system 110). In some implementations, one or more process blocks of FIG. 4 may be performed by another device or a group of devices separate from or including the device, such as a client device (e.g., client device 130) and/or a client device (e.g., client device 115). Additionally, or alternatively, one or more process blocks of FIG. 4 may be performed by one or more components of device 300, such as processor 320, memory 330, storage component 340, input component 350, output component 360, and/or communication component 370.

As shown in FIG. 4, process 400 may include analyzing a plurality of entries of a data set (block 410). For example, the data visualization system may analyze a plurality of entries of a data set, as described above. In some implementations, the plurality of entries identify a plurality of variables. In some implementations, each entry, of the plurality of entries, indicates a co-occurrence of variables of different types.

As further shown in FIG. 4, process 400 may include identifying, based on analyzing the plurality of entries, variables of a first type and variables of a second type (block 420). For example, the data visualization system may identify, based on analyzing the plurality of entries, variables of a first type and variables of a second type, as described above.

As further shown in FIG. 4, process 400 may include determining relationships between the variables of the first type and variables of the second type based on co-occurrences indicated by the plurality of entries (block 430). For example, the data visualization system may determine relationships between the variables of the first type and variables of the second type based on co-occurrences indicated by the plurality of entries, as described above. In some implementations, the relationships are determined without determining meaning of the variables of the first type and the variables of the second type.

As further shown in FIG. 4, process 400 may include generating a network diagram based on the relationships (block 440). For example, the data visualization system may generate a network diagram based on the relationships, as described above. In some implementations, the network diagram includes nodes and edges between the nodes. Each node, of the nodes, represents a variable of the plurality of variables. Each edge, of the edges, represents a relationship of the relationships.

As further shown in FIG. 4, process 400 may include detecting a display size of a display device associated with the device (block 450). For example, the data visualization system may detect a display size of a display device associated with the device, as described above.

As further shown in FIG. 4, process 400 may include determining, based on the display size, a subset of the network diagram to provide to the display device (block 460). For example, the data visualization system may determine, based on the display size, a subset of the network diagram to provide to the display device, as described above. In some implementations, the subset of the network diagram includes: a particular node representing a particular variable, of the plurality of variables, associated with a quantities of co-occurrences that is highest out of a quantity of co-occurrences associated with each of the plurality of variables, and one or more other nodes representing one or more other variables, of the plurality of variables, that co-occur with the particular variable.

As further shown in FIG. 4, process 400 may include providing the subset of the network diagram to the display device for display (block 470). For example, the device may provide the subset of the network diagram to the display device for display, as described above.

Process 400 may include additional implementations, such as any single implementation or any combination of implementations described below and/or in connection with one or more other processes described elsewhere herein.

In a first implementation, process 400 includes determining a size of the particular node based on the quantity of co-occurrences associated with the particular node, and determining a size of the one or more other nodes based the quantity of co-occurrences associated with the one or more other nodes, wherein the size of the particular node exceeds the size of the one or more other nodes based on the quantity of co-occurrences associated with the particular node exceeding the quantity of co-occurrences associated with the one or more other nodes.

In a second implementation, process 400 includes determining a visual attribute of an edge between the particular node and one of the one or more other nodes, wherein the visual attribute is determined based on a quantity of times the particular variable occurs with another variable represented by the one of the one or more other nodes.

In a third implementation, determining the visual attribute comprises determining a width of the edge between the particular node and the one of the one or more other nodes, wherein the width is based on the quantity of times the particular variable occurs with another variable represented by the one of the one or more other nodes.

In a fourth implementation, process 400 includes identifying, based on analyzing the plurality of entries, variables of a third type, wherein the particular variable is a variable of the first type, wherein a first variable, of the one or more other variables, is a variable of the second type, and wherein a second variable, of the one or more other variables, is a variable of the third type.

In a fifth implementation, process 400 includes determining a first visual attribute of an edge between the particular node and a first node, of the one or more other nodes, representing the first variable, and determining a second visual attribute of an edge between the particular node and a second node, of the one or more other nodes, representing the second variable, wherein the second visual attribute is different than the first visual attribute.

In a sixth implementation, determining the first visual attribute comprises determining a first color of the edge between the particular node and the first node, and wherein determining the second visual attribute comprises determining a second color of the edge between the particular node and the second node.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method by a device, the method comprising:
    analyzing a plurality of entries of a data set,
        wherein the plurality of entries include rows that identify a plurality of variables,
        wherein each entry, of the plurality of entries, indicates a co-occurrence of variables of different types, and
        wherein a row includes the variables of different types;
    identifying, based on analyzing the plurality of entries, variables of a first type and variables of a second type;
    determining relationships between the variables of the first type and the variables of the second type based on co-occurrences indicated by the plurality of entries,
        wherein the relationships are determined without determining meanings of the variables of the first type and the variables of the second type;
    generating a network diagram based on the relationships,
        wherein the network diagram includes nodes and edges between the nodes,
        wherein each node, of the nodes, represents a variable of the plurality of variables, and
        wherein each edge, of the edges, represents a relationship of the relationships;
    detecting a display size of a display device associated with the device;
    determining, based on the display size, a number of nodes of the network diagram to provide to the display device,
        wherein the number of nodes of the network diagram includes:
            a particular node representing a particular variable, of the variables of the first type, associated with a quantities of co-occurrences that is highest out of a quantity of co-occurrences associated with each of the variables of the first type, and
            one or more other nodes representing one or more other variables, the variables of the first type, that co-occur with the particular variable,
        wherein the particular node is a common variable of the first type, and
        wherein a size of the particular node exceeds a size of the one or more other nodes based on the particular node being the common variable of the first type, and
        wherein the number of nodes of the network diagram is less than an entirety of the network diagram; and
    providing the number of nodes of the network diagram to the display device for display.

2. The method of claim 1, further comprising:
    determining the size of the particular node based on the quantity of co-occurrences associated with the particular node; and
    determining the size of the one or more other nodes based on the quantity of co-occurrences associated with the one or more other nodes,
        wherein the size of the particular node exceeds the size of the one or more other nodes based on the quantity of co-occurrences associated with the particular node exceeding the quantity of co-occurrences associated with the one or more other nodes.

3. The method of claim 1, further comprising:
    determining a visual attribute of an edge between the particular node and one of the one or more other nodes,
        wherein the visual attribute is determined based on a quantity of times the particular variable occurs with another variable represented by the one of the one or more other nodes.

4. The method of claim 3, wherein determining the visual attribute comprises:
    determining a width of the edge between the particular node and the one of the one or more other nodes,
        wherein the width is based on the quantity of times the particular variable occurs with another variable represented by the one of the one or more other nodes.

5. The method of claim 1, further comprising:
    identifying, based on analyzing the plurality of entries, variables of a third type,
        wherein the particular variable is a variable of the first type,
        wherein a first variable, of the one or more other variables, is a variable of the second type, and
        wherein a second variable, of the one or more other variables, is a variable of the third type.

6. The method of claim 5, further comprising:
    determining a first visual attribute of an edge between the particular node and a first node, of the one or more other nodes, representing the first variable; and
    determining a second visual attribute of an edge between the particular node and a second node, of the one or more other nodes, representing the second variable,
        wherein the second visual attribute is different than the first visual attribute.

7. The method of claim 6, wherein determining the first visual attribute comprises:
    determining a first color of the edge between the particular node and the first node; and
    wherein determining the second visual attribute comprises:

determining a second color of the edge between the particular node and the second node.

8. A device, comprising:
one or more memories; and
one or more processors, communicatively coupled to the one or more memories, configured to:
obtain a data set that includes a plurality of entries,
wherein the plurality of entries include rows that identify a plurality of variables, and
wherein each entry, of the plurality of entries, indicates a co-occurrence of variables of different types, and
wherein a row includes the variables of different types;
determine relationships between variables of a first type and variables of a second type based on co-occurrences indicated by the plurality of entries,
wherein the relationships are determined without determining meaning of the variables of the first type and the variables of the second type;
generate, based on the relationships, a network diagram includes nodes and edges between the nodes,
wherein each node, of the nodes, represents a variable of the variables of the first type and variables of the second type, and
wherein each edge, of the edges, represents a relationship of the relationships;
detect a display size of a display device associated with the device;
determine, based on the display size, a number of nodes of the network diagram to provide to the display device,
wherein the number of nodes of the network diagram includes:
a particular node representing a particular variable, of the plurality of variables, associated with a quantities of co-occurrences that is highest out of a quantity of co-occurrences associated with each of the plurality of variables, and
one or more other nodes representing one or more other variables, of the plurality of variables, that co-occur with the particular variables,
wherein the particular node is a common variable of the first type, and
wherein a size of the particular node exceeds a size of the one or more other nodes based on the particular node being the common variable of the first type; and
provide the number of nodes of the network diagram to the display device for display,
wherein the number of nodes of the network diagram is less than an entirety of the network diagram.

9. The device of claim 8, wherein the one or more other nodes are one or more first nodes,
wherein the one or more other variables are one or more first variables, and
wherein the one or more processors are further configured to:
determine that the relationships include a relationship between the one or more first variables and one or more second variables of the plurality of variables;
generate a recommendation for the one or more second variables,
wherein the recommendation identifies the particular variable; and
provide the recommendation to one or more devices.

10. The device of claim 8, wherein the one or more processors are further configured to:

cause one or more resources to be deployed based on the relationships.

11. The device of claim 8, wherein the particular variable is a variable of the first type,
wherein the one or more other variables are variables of the second type, and
wherein the one or more processors are further configured to:
determine a first quantity of co-occurrences associated with a first variable of the one or more other variables;
determine a second quantity of co-occurrences associated with a second variable of the one or more other variables;
determine a size of a first node, of the one or more other nodes, based on the first quantity of co-occurrences; and
determine a size of a second node, of the one or more other nodes, based on the second quantity of co-occurrences.

12. The device of claim 11, wherein the one or more processors are further configured to:
determine that the first quantity of co-occurrences exceeds the second quantity of co-occurrences; and
determine that the size of the first node exceeds the size of the second node based on determining that that the first quantity of co-occurrences exceeds the second quantity of co-occurrences.

13. The device of claim 8, wherein the one or more processors are further configured to:
determining the size of the particular node based on the quantity of co-occurrences associated with the particular node; and
determining the size of the one or more other nodes based the quantity of co-occurrences associated with the one or more other nodes,
wherein the size of the particular node exceeds the size of the one or more other nodes based on the quantity of co-occurrences associated with the particular node exceeding the quantity of co-occurrences associated with the one or more other nodes.

14. The device of claim 8, wherein the one or more processors are further configured to:
identify, based on analyzing the plurality of entries, variables of a third type;
wherein the particular variable is a variable of the first type,
wherein a first variable, of the one or more other variables, is a variable of the second type, and
wherein a second variable, of the one or more other variables, is a variable of the third type;
determine a first visual attribute of an edge between the particular node and a first node, of the one or more other nodes, representing the first variable; and
determine a second visual attribute of an edge between the particular node and a second node, of the one or more other nodes, representing the second variable,
wherein the second visual attribute is different than the first visual attribute.

15. A non-transitory computer-readable medium storing a set of instructions, the set of instructions comprising:
one or more instructions that, when executed by one or more processors of a device, cause the device to:
obtain a data set that includes a plurality of entries,
wherein the plurality of entries include rows that identify a plurality of variables, and wherein each entry, of the plurality of entries, indicates a co-occurrence of variables of different types, and
wherein a row includes the variables of different types;
determine relationships between variables of a first type and variables of a second type based on co-occurrences indicated by the plurality of entries,
wherein the relationships are determined without determining meaning of the variables of the first type and the variables of the second type;
generate, based on the relationships, a network diagram includes nodes and edges between the nodes,
wherein each node, of the nodes, represents a variable of the variables of the first type and variables of the second type, and
wherein each edge, of the edges, represents a relationship of the relationships;
detect a display size of a display device associated with the device;
determine, based on the display size, a number of nodes of the network diagram to provide to the display device,
wherein the number of nodes of the network diagram includes:
a particular node representing a particular variable, of the plurality of variables, associated with a quantities of co-occurrences that is highest out of a quantity of co-occurrences associated with each of the plurality of variables, and
one or more other nodes representing one or more other variables, of the plurality of variables, that co-occur with the particular variable; and
provide the number of nodes of the network diagram to the display device for display.

16. The non-transitory computer-readable medium of claim 15, wherein the one or more instructions further cause the device to:
determine a size of the particular node based on the quantity of co-occurrences associated with the particular node; and
determine a size of the one or more other nodes based the quantity of co-occurrences associated with the one or more other nodes,
wherein the size of the particular node exceeds the size of the one or more other nodes based on the quantity of co-occurrences associated with the particular node exceeding the quantity of co-occurrences associated with the one or more other nodes.

17. The non-transitory computer-readable medium of claim 15, wherein the one or more instructions further cause the device to:
determine a visual attribute of an edge between the particular node and one of the one or more other nodes,
wherein the visual attribute is determined based on a quantity of times the particular variable occurs with another variable represented by the one of the one or more other nodes.

18. The non-transitory computer-readable medium of claim 17, wherein the one or more instructions, that cause the device to determine the visual attribute, cause the device to:
determine a width of the edge between the particular node and the one of the one or more other nodes,
wherein the width is based on the quantity of times the particular variable occurs with another variable represented by the one of the one or more other nodes.

19. The non-transitory computer-readable medium of claim 17, wherein the one or more instructions further cause the device to:
identify, based on analyzing the plurality of entries, variables of a third type;
wherein the particular variable is a variable of the first type,
wherein a first variable, of the one or more other variables, is a variable of the second type, and
wherein a second variable, of the one or more other variables, is a variable of the third type;
determine a first visual attribute of an edge between the particular node and a first node, of the one or more other nodes, representing the first variable; and
determine a second visual attribute of an edge between the particular node and a second node, of the one or more other nodes, representing the second variable,
wherein the second visual attribute is different than the first visual attribute.

20. The non-transitory computer-readable medium of claim 19, wherein the one or more instructions, that cause the device to determine the first visual attribute, cause the device to:
determine a first color of the edge between the particular node and the first node; and
wherein the one or more instructions, that cause the device to determine the second visual attribute, cause the device to:
determine a second color of the edge between the particular node and the second node.

* * * * *